Sept. 22, 1953  J. L. POMEROY  2,652,963
AUTOMATIC BOTTLE SEALING
Filed July 3, 1946  14 Sheets-Sheet 2

INVENTOR.
JACK LEE POMEROY

Sept. 22, 1953  J. L. POMEROY  2,652,963
AUTOMATIC BOTTLE SEALING
Filed July 3, 1946  14 Sheets-Sheet 3
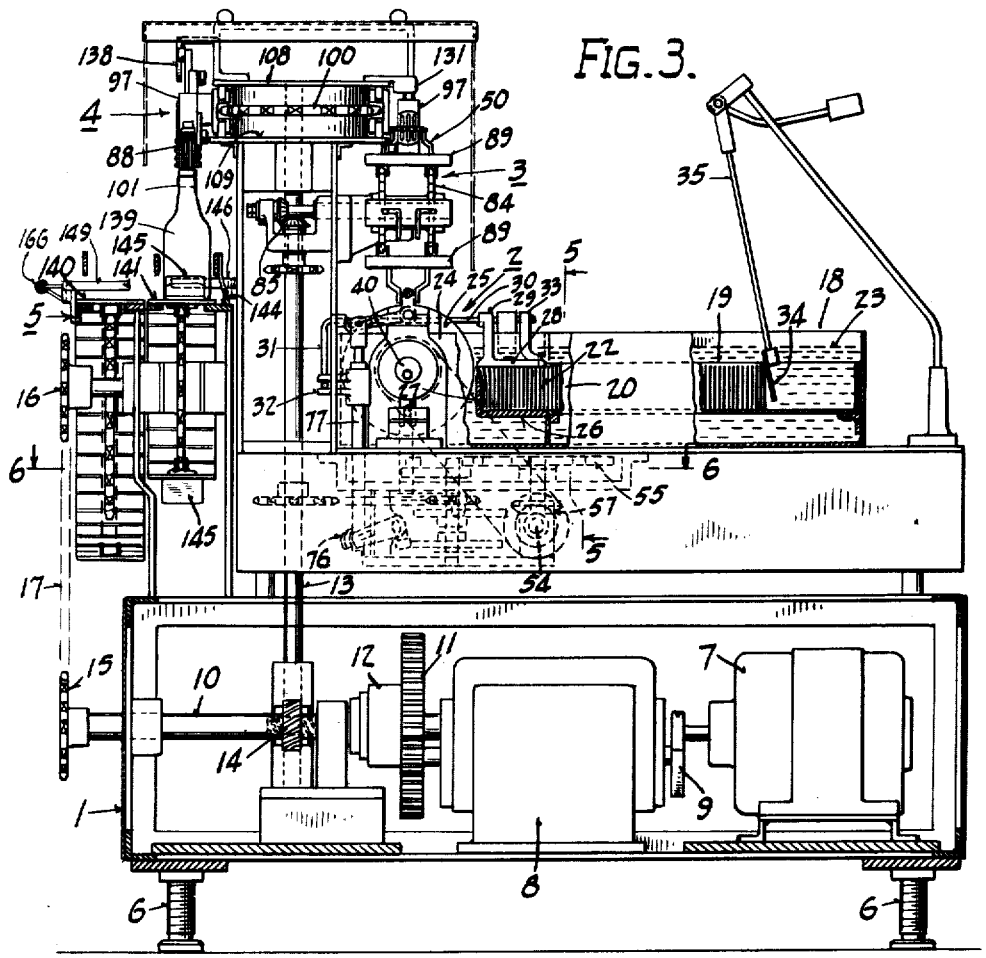
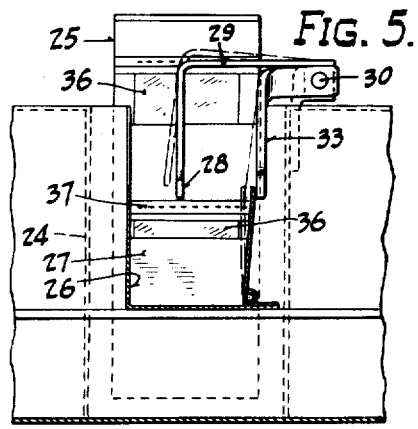
INVENTOR.
JACK LEE POMEROY
BY
ATTORNEY.

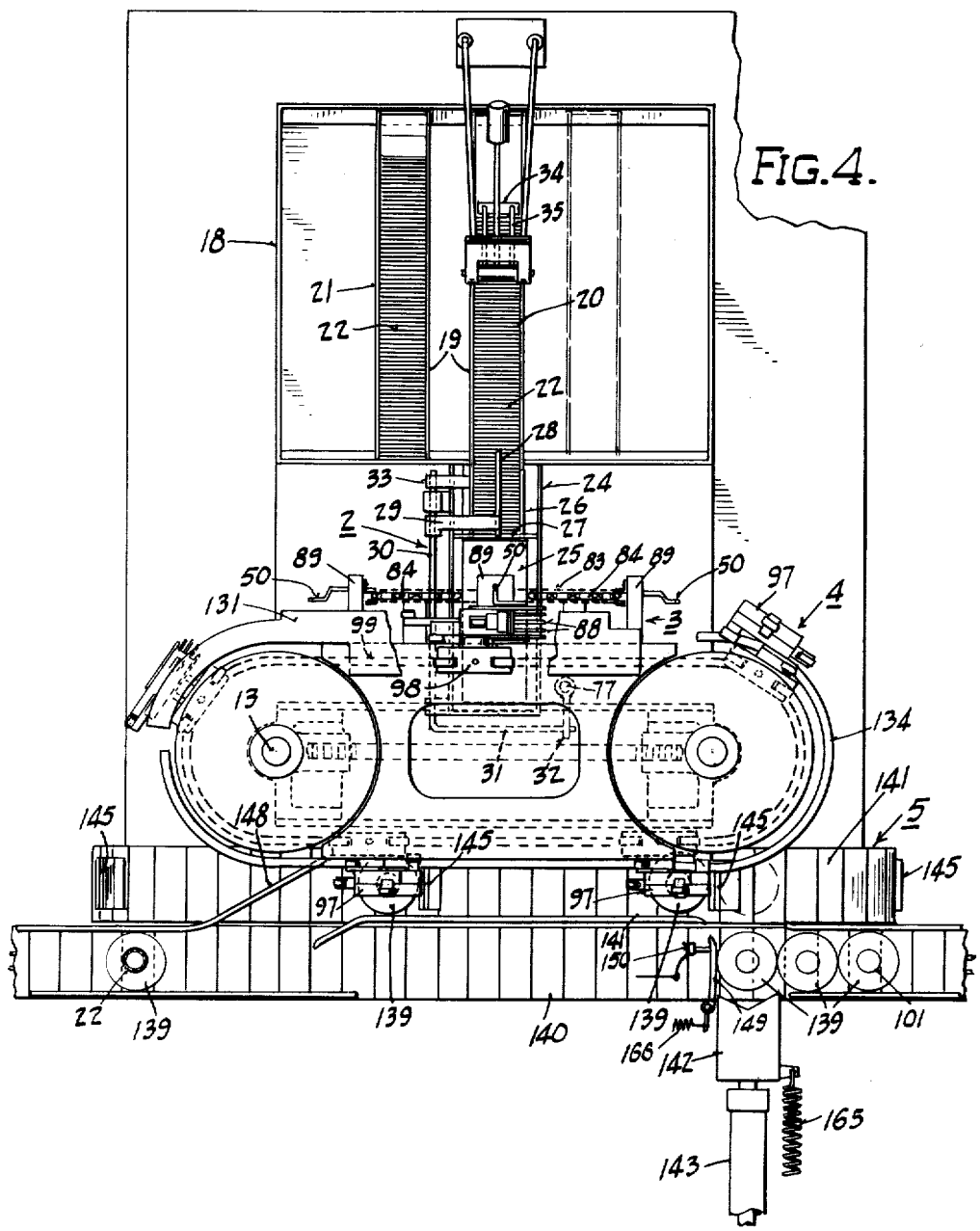

Sept. 22, 1953  J. L. POMEROY  2,652,963
AUTOMATIC BOTTLE SEALING
Filed July 3, 1946  14 Sheets-Sheet 5

INVENTOR.
JACK LEE POMEROY
BY
ATTORNEY.

Sept. 22, 1953  J. L. POMEROY  2,652,963
AUTOMATIC BOTTLE SEALING
Filed July 3, 1946  14 Sheets-Sheet 6

INVENTOR.
JACK LEE POMEROY
BY
ATTORNEY.

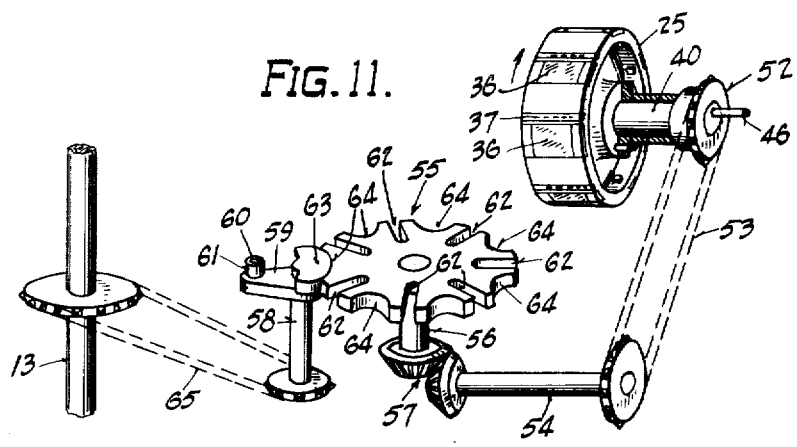
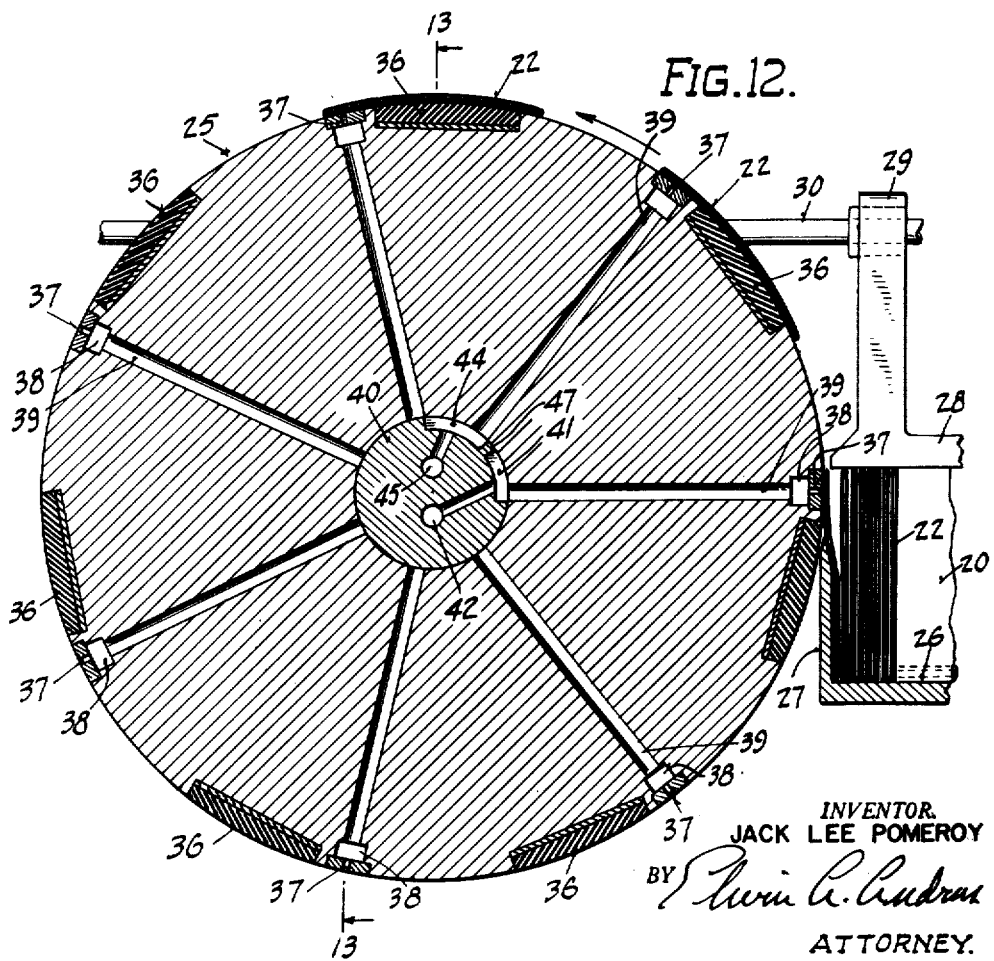

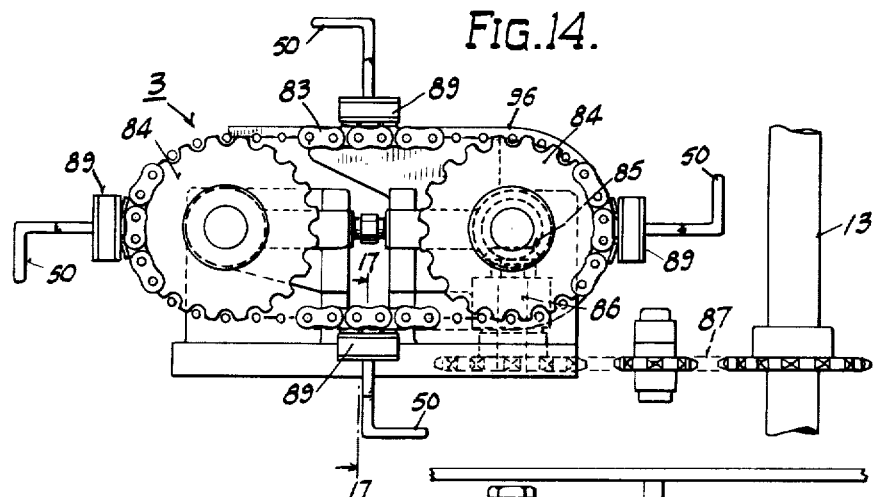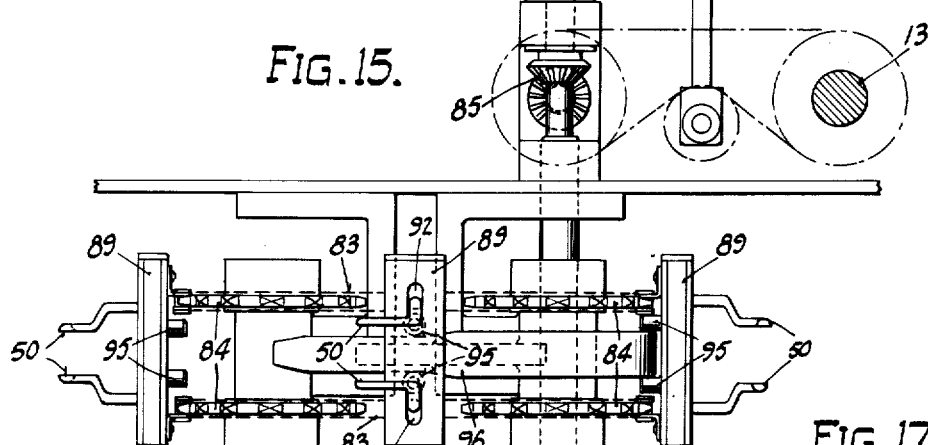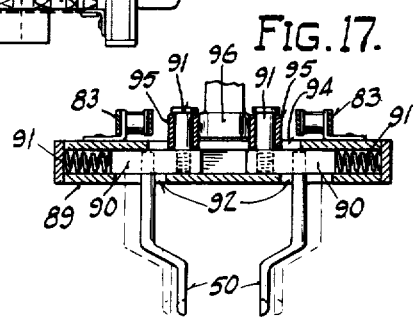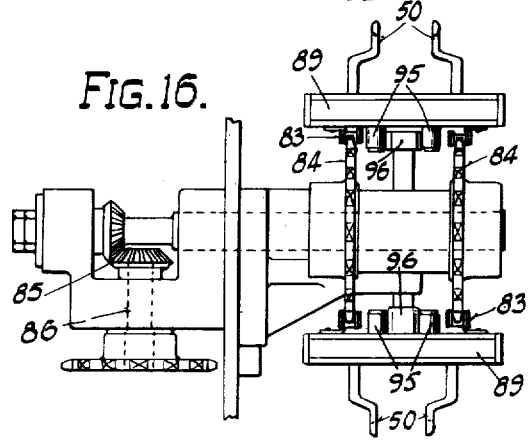

Sept. 22, 1953 J. L. POMEROY 2,652,963
AUTOMATIC BOTTLE SEALING
Filed July 3, 1946 14 Sheets-Sheet 10
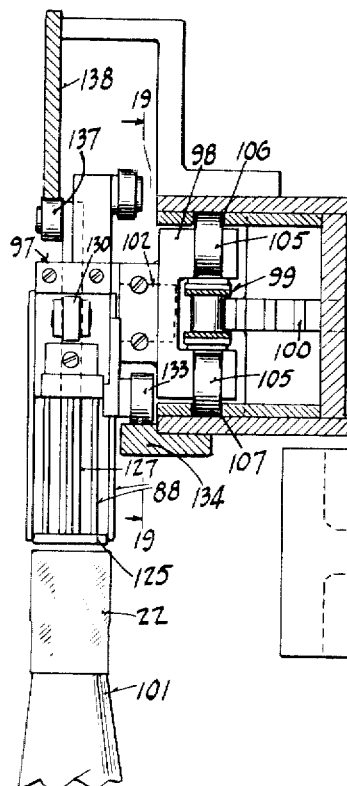
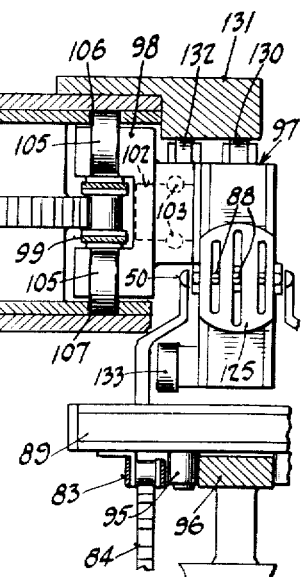
FIG. 18.
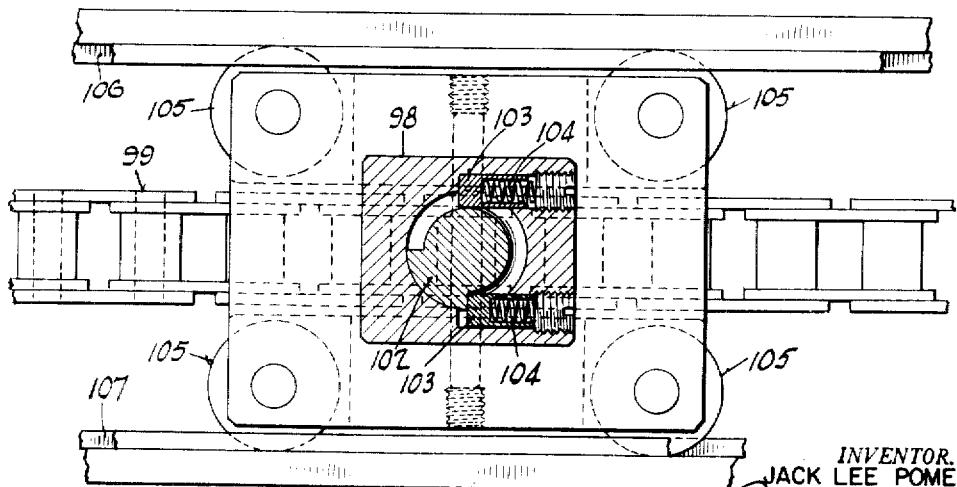
FIG. 19.
INVENTOR.
JACK LEE POMEROY
BY
ATTORNEY.

Sept. 22, 1953 J. L. POMEROY 2,652,963
AUTOMATIC BOTTLE SEALING
Filed July 3, 1946 14 Sheets-Sheet 11
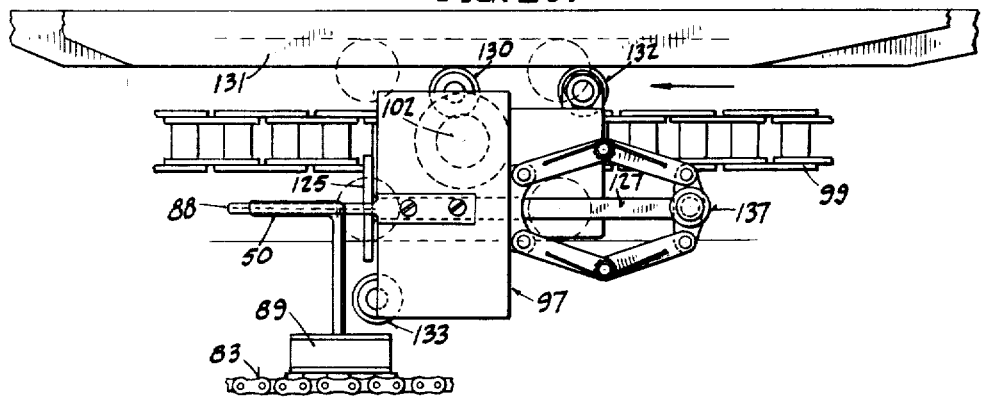
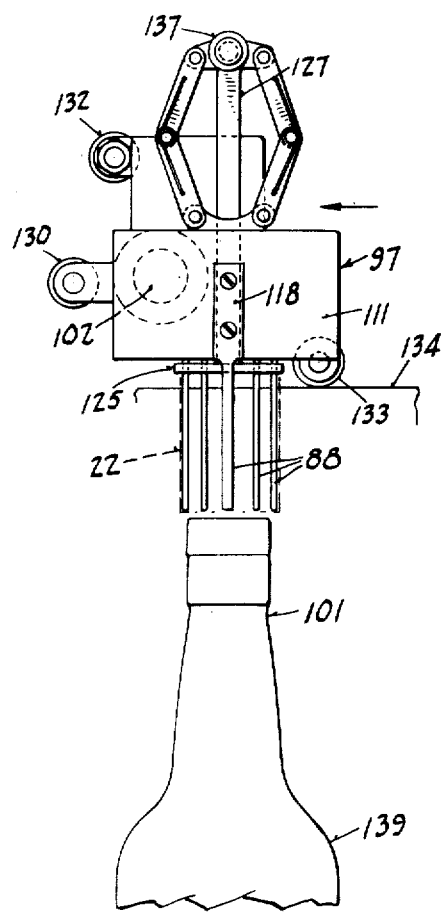
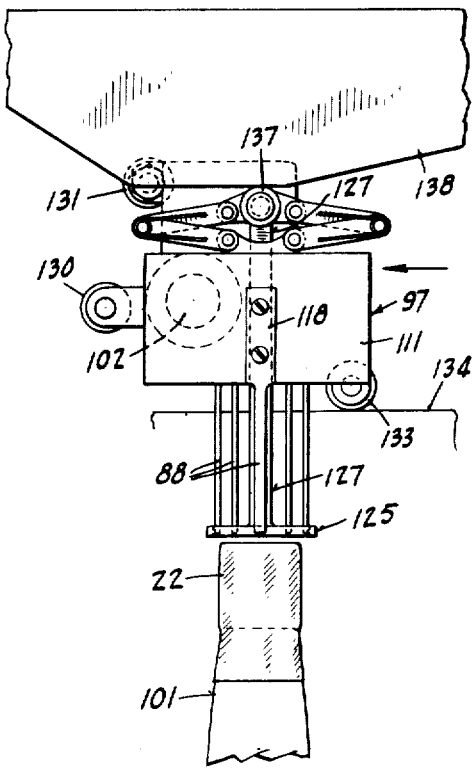
INVENTOR.
JACK LEE POMEROY
BY
ATTORNEY.

Sept. 22, 1953  J. L. POMEROY  2,652,963
AUTOMATIC BOTTLE SEALING
Filed July 3, 1946  14 Sheets-Sheet 12
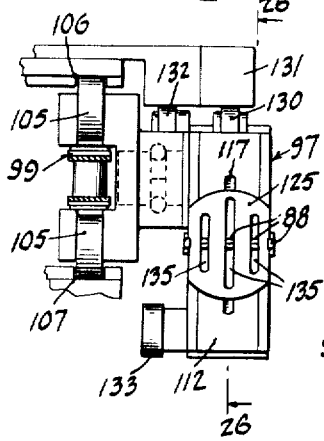
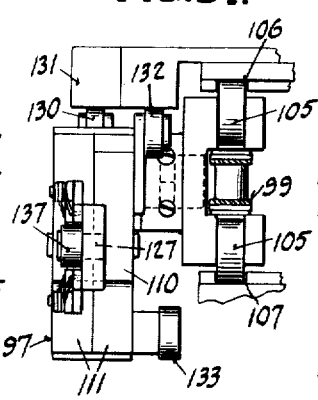
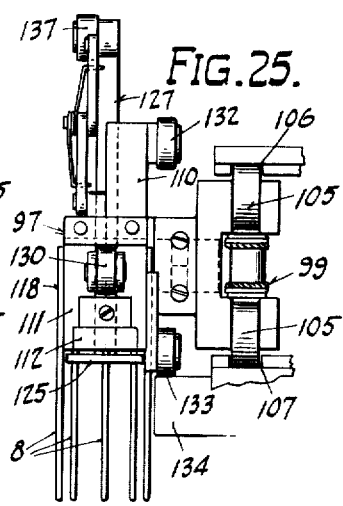
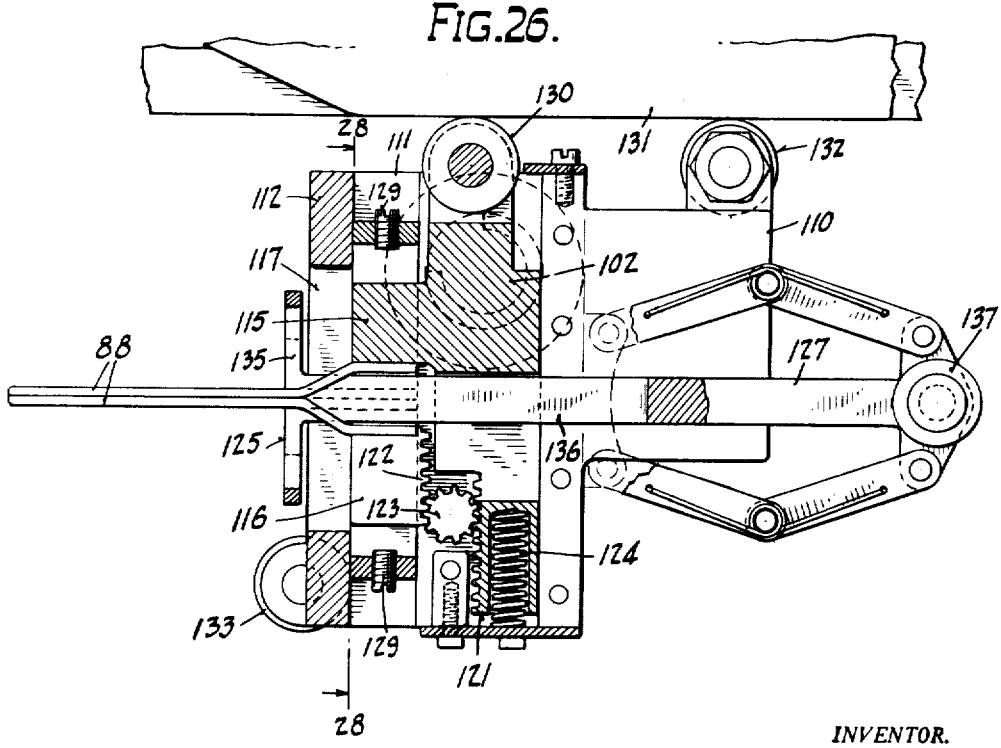
INVENTOR.
JACK LEE POMEROY
BY
ATTORNEY.

Sept. 22, 1953  J. L. POMEROY  2,652,963
AUTOMATIC BOTTLE SEALING
Filed July 3, 1946  14 Sheets-Sheet 13

Patented Sept. 22, 1953

2,652,963

UNITED STATES PATENT OFFICE 2,652,963

AUTOMATIC BOTTLE SEALING

Jack Lee Pomeroy, Madison, Wis., assignor to Gisholt Machine Company, Madison, Wis., a corporation of Wisconsin Application July 3, 1946, Serial No. 681,299

27 Claims. (Cl. 226—80)

This invention relates to an automatic bottle sealing machine constructed to apply tubular shrink fit regenerated cellulose seals to bottles and the like.

One of the principal objects of the invention is to obtain greater speed and accuracy in applying the seals to bottles.

Another object is to shorten the time which it takes for a seal to pass through the machine from the magazine in the preservative liquid to placement on the bottle top.

Another object is to provide a smoother operating machine free from undesirable vibration.

Another object is to provide a machine capable of operating at higher speeds than previous machines.

Another object is to provide a more compact machine requiring less floor space.

Another object of the invention is to provide a machine that will apply the seals to bottles while the latter are moving on a conveyor so that the bottle conveyor need not be stopped.

Another object of the invention is to provide a machine in which the transfer fingers carrying the seals move continuously in a closed path as distinguished from reciprocation, and thereby faster movement is obtainable.

Another object is to provide a machine having a plurality of like loader heads and seal carrying members so that one may be receiving a seal while another is depositing or discharging a seal.

Another object is to provide a machine in which the transfer of the seals to the successive seal carrying members of the machine is more readily accomplished.

Another object is to provide for a dual magazine construction in the tank so that a continuous supply of seals may be fed to the machine.

Another object is to provide a machine having a stripper drum rotated intermittently for removing the seals one by one from a stack or magazine and in which the drum is driven more smoothly and more accurately indexed.

Another object is to provide a simpler and more accurate drive for the loader heads.

Other objects and advantages of the invention will appear in the description of an embodiment of the invention illustrated in the accompanying drawings.

In the drawings:

Fig. 3 is an end elevation of the machine with the lower casing wall removed to show the drive and with parts broken away;

Fig. 4 is a top plan view of the machine with the hood removed;

Fig. 5 is a detail section taken on line 5—5 of Fig. 3;

Fig. 11 is an enlarged schematic showing of the mechanism for operating the drum intermittently;

Fig. 12 is a transverse vertical section through the drum and the valve;

Fig. 14 is an enlarged elevation of the transfer carriage showing the drive therefor;

Fig. 15 is a top plan view of the transfer carriage of Fig. 14;

Fig. 16 is an end elevation of the transfer carriage of Fig. 14;

Fig. 17 is a detail sectional view taken on line 17—17 of Fig. 14 to show the mechanism of the transfer finger support;

Fig. 18 is an enlarged transverse vertical section taken on line 18—18 of Fig. 1 showing the loading carriage and its cams;

Fig. 19 is an enlarged section of a loader head taken on line 19—19 of Fig. 18;

Fig. 20 is a side elevation of a loader head as it appears on the rear of the loader carriage for receiving a seal;

Fig. 21 is a similar view of the head as it appears on the front of the loader carriage ready to drop a seal onto a bottle;

Fig. 22 is a similar view of the head with the stripper plate lowered and the seal stripped from the fingers;

Fig. 23 is a front end elevation of the head as it appears in Fig. 20;

Fig. 24 is a rear end elevation of the head as it appears in Fig. 20;

Fig. 25 is a rear end elevation of the head as it appears in Fig. 21;

Fig. 26 is a transverse vertical section through the head taken on line 26—26 of Fig. 23;

Figure 1:
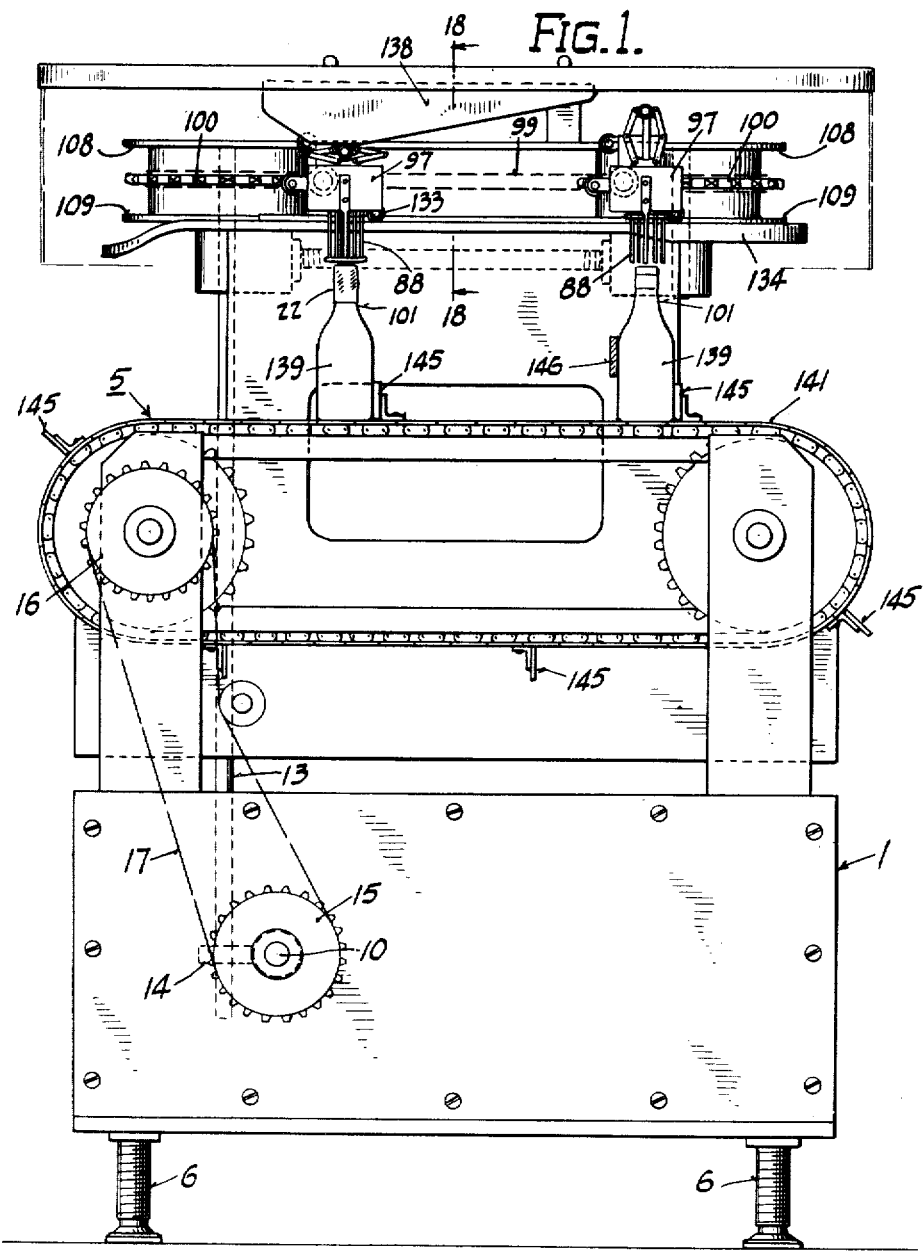
Figure 1 is a front side elevation of the machine.
Figure 2:
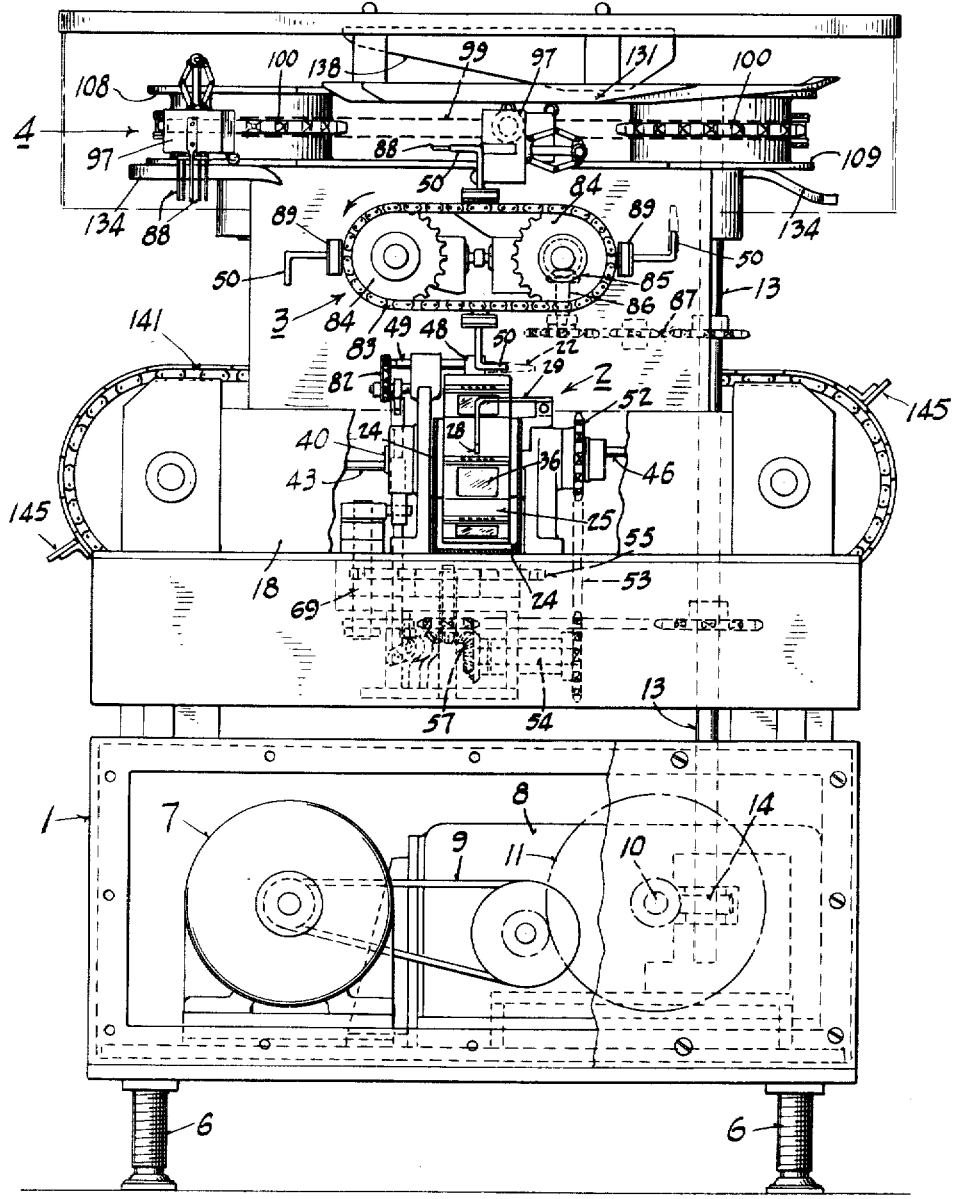
Fig. 2 is a rear side elevation of the machine with the lower casing broken away to show the drive.
Figure 6:
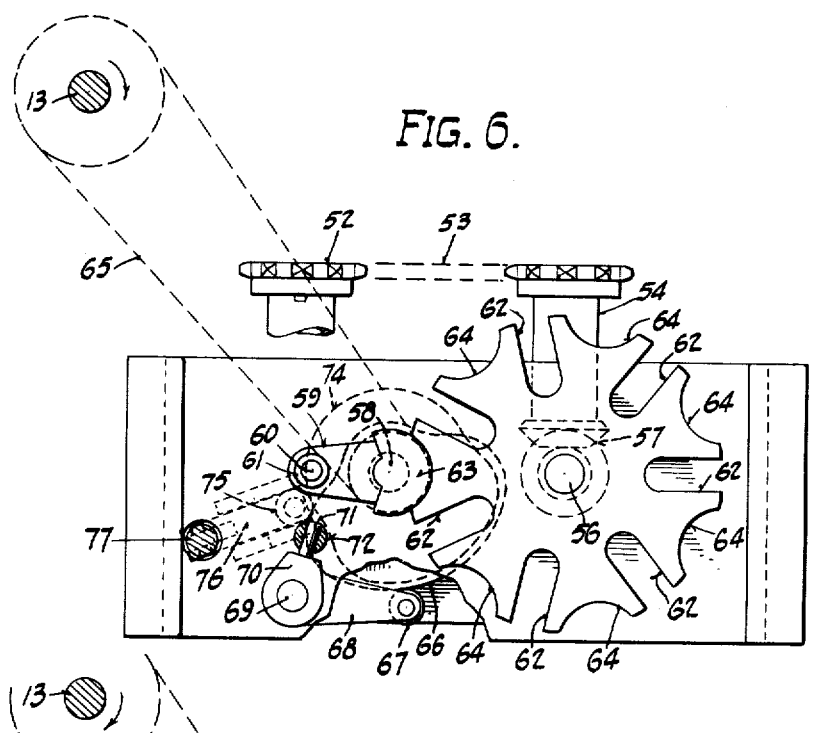
Fig. 6 is an enlarged horizontal section taken on line 6—6 of Fig. 3 and showing the Geneva drive in plan view with the stripper drum locked against rotation.
Figure 7:
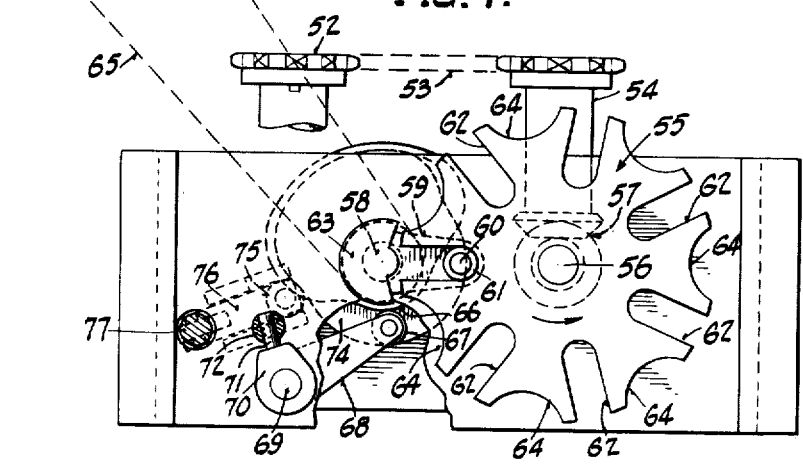
Fig. 7 is a view similar to Fig. 6 showing the drive in the opposite extreme of the drum rotation.
Figure 8:
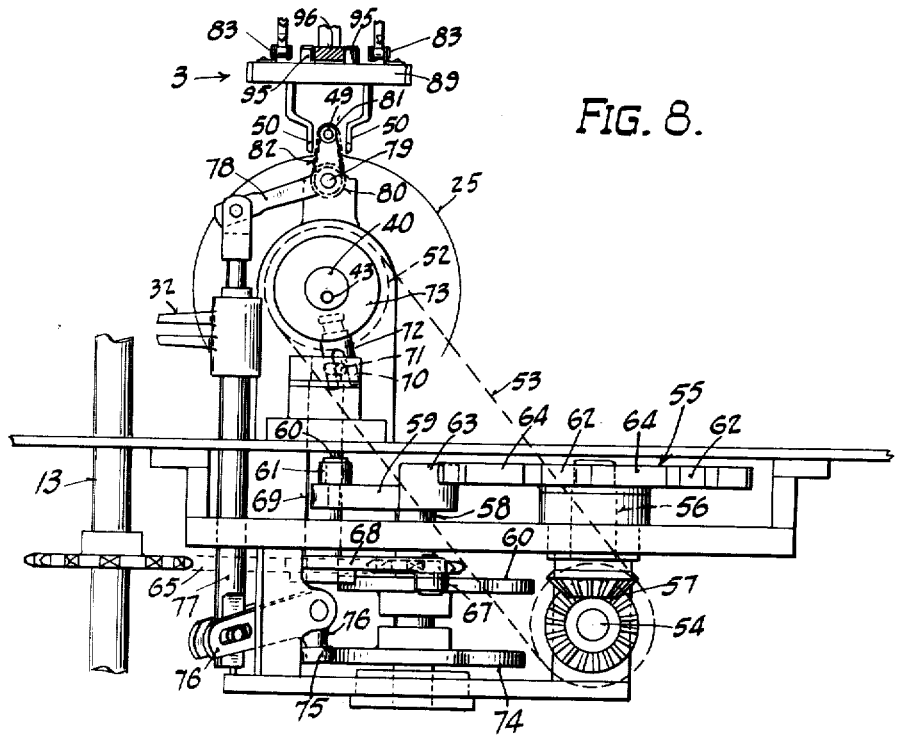
Fig. 8 is an enlarged side elevation of the drive as shown in Fig. 6 and with parts broken away.

The machine embodies certain of the features of the co-pending application Serial No. 665,885 filed on April 29, 1946 by the present inventor and William Barton Eddison, and now issued to Patent No. 2,630,956, for Machine for Applying Sealing Bands to Bottles.

The machine comprises, in general, a base 1 containing the drive mechanism, a seal supply mechanism 2 containing a magazine and stripping means for removing seals one by one and opening the same, a transfer carriage 3 having a plurality of transfer fingers to pick up the seals from the stripper, a loader 4 adapted to pick up the seals from the transfer carriage and apply the same to corresponding bottles, and a bottle feeding mechanism 5.

The several parts referred to are mounted on the base to provide a compact unitary machine and the moving parts are enclosed by suitable casings or guard members to which reference need not be made and which are not always shown in the drawings.

The base 1 of the machine is a rectangular box-like structure mounted on suitable corner legs 6 and which supports the machine. The base 1 contains the drive motor 7 which drives a variable speed mechanism 8 by means of the belt 9.

The variable speed mechanism 8 drives a main drive shaft 10 by means of the speed reducer 11 and the single revolution clutch 12. The shaft 10 drives the vertical drive shaft 13 by means of the worm gearing 14 and has a sprocket 15 on its outer end for driving a sprocket 16 on the bottle feeding mechanism 5 by chain 17.

The vertical drive shaft 13 drives the seal supply mechanism 2, the transfer mechanism 3 and the loader mechanism 4 in coordination.

The supply mechanism 2 comprises a tank 18 containing a magazine 19 receiving two horizontal stacks 20 and 21 of flattened tubular seals 22 disposed on edge. The seals 22 are arranged with their closed or folded edges at the top and bottom and with their end edges at the sides of the stack.

The tank 18 contains preservative liquid 23 covering the stacks of seals 22 so that the seals are kept submerged in the liquid until they are stripped one by one from the stack for application to bottles. The front end of the tank 18 has a narrow extension 24 of approximately the width of one of the stacks 20 and 21 and in which a stripper drum 25 is mounted for rotation partially submerged in the liquid 23.

The magazine 19 constitutes a pair of parallel shallow horizontal troughs, shaped to receive the seals, and with one trough disposed radially of the drum 25 with the inner end of the trough adjacent the outer drum surface to present the end seal 22 against the drum.

The trough of stack 20 is shown in operative position relative to drum 25. The trough of stack 21 is shown at one side ready to be moved over to operative position as soon as the seals 22 have been fed from the trough of stack 20. Interchanging of the troughs in this manner provides one trough being filled by the operator while the other trough is supplying seals to the stripper drum.

The operative trough for stack 20 registers with a fixed chute 26 constituting an end extension for the trough and which receives the seals 22 therefrom and feeds the seals to the drum 25.

One side of chute 26 is hinged at the bottom to provide for movement of the same periodically against the stack of seals passing through the chute for straightening of the stack as the seals approach the drum. The chute 26 has an end plate 27 disposed near the drum 25 and adapted to expose the upper part of the adjacent seal to the drum surface as shown in Fig. 12.

A shoe 28 extends over the top of the stack 20 in chute 26 and extends longitudinally of the stack to provide for leveling of the seals uniformly as they approach the drum 25. The inner edge of shoe 28 is spaced from the drum 25 a distance equal to the maximum thickness of a seal, generally about .04 inch.

The shoe 28 is suspended by an arm 29 secured to a rock shaft 30 which is periodically rocked by an arm 31 engaged by a vertically reciprocating abutment 32 hereinafter described.

The periodic movement of the hinged side of chute 26 is likewise effected by rock shaft 30 by means of arm 33 which engages and supports the side of the chute as shown in Figs. 4 and 5.

A vertical pressure plate 34 engages the rear end of the stack of seals 20 and presses the stack forwardly constantly toward the drum 25. For this purpose the plate 34 is preferably mounted on a long pivotal arm 35 which is weighted to bias the plate toward the drum.

The drum 25 has a plurality of circumferentially spaced inserts 36 thereon, of non-slip rubber or the like, each being adapted to constitute an opening station on the drum for receiving a seal 22.

In advance of each insert 36 on the drum, a slot or a series of vacuum ports 37 is arranged across the drum. At the stripper station adjacent the end of stack 20, the vacuum ports 37 are disposed above the upper edge of insert 36 to effect stripping of a seal upwardly from the stack upon rotation of the drum, to register with the seal near the top folded edge of the latter.

The drum 25 is rotated intermittently to locate a stripper face 36 at the end of the stack of seals for each dwell and to lift a seal from the stack to the opener station in two intermittent movements of rotation.

For this purpose the seals are individually secured to the face of the drum by the vacuum or suction applied to the upper edge of the seals through ports 37. These ports 37 are connected by a header 38 in turn connected by radial passages 39 to a valve member 40 which constitutes the drum shaft.

The radial passages 39 connecting with the ports 37 at the stripper station communicate with a recess 41 in the outer surface of shaft 40 and thence through a longitudinal passage 42 in shaft 40 to a conduit 43 leading to a vacuum pump in the base (not shown).

The radial passages 39 connecting with the ports 37 at the holding station next above the stripper station communicate with a recess 44 in the outer surface of shaft 40 and thence through a longitudinal passage 45 in shaft 40 to a conduit 46 similarly connected to the vacuum pump system.

The recesses 41 and 44 are separated circumferentially of the shaft 40 by a narrow rib 47, and each extends circumferentially of shaft 40 a distance sufficient to connect with a single set of radial passages 39 and nearly to the next adjacent set, there being a set of radial passages 39 for each set of ports 37 and stripper insert 36. Recesses 41 and 44 always communicate with adjacent sets of passages 39.

When the drum 25 is indexed and a band 22 is about to be stripped from the stack 20, or 21, the lower recess 41 applies suction to the stripper station next to the foot of the stack and the upper recess 44 applies suction to the corresponding station next above the stack. When drum 25 is rotated to its next succeeding indexed position, shaft 40 is likewise rotated to maintain the vacuum on the bands 22 at the two stations during the rotational movement of the drum.

As soon as the drum 25 is indexed at its next position, the shaft 40 is rotated in a reverse direction an amount equal to the previous rotational movement, and during which reverse movement it continues to apply a vacuum to the band 22 at the station above the stack. When the shaft 40 reaches the end of its reverse stroke it connects the lower recess 41 with the passages 39 for the next succeeding stripper station at the foot of the stack and secures a band 22 to the drum for stripping the band from the stack upon the next rotational movement of the drum, and at the same time, the upper recess 44 is connected with passages 39 for the angularly disposed station next above the stack.

The shaft 40 constitutes a valve member for applying vacuum to the several stripper stations in succession as the latter are presented to the magazine and rise above the same in the stripping operation. The vacuum is applied to each band 22 along the upper closed edge thereof where there is little danger of warping the band.

The rib 47 should be of less width than the diameter of passages 39 so that a vacuum is maintained continuously upon the band 22 at the holding station as the rib passes the mouth of the corresponding passages 39 in the return movement of shaft 40.

Where a band 22 may not be present at one of the stations referred to, as when starting or stopping a run, a vacuum nevertheless may be applied to the other station by reason of the separate conduits 43 and 46 and their corresponding connections.

Figure 9:
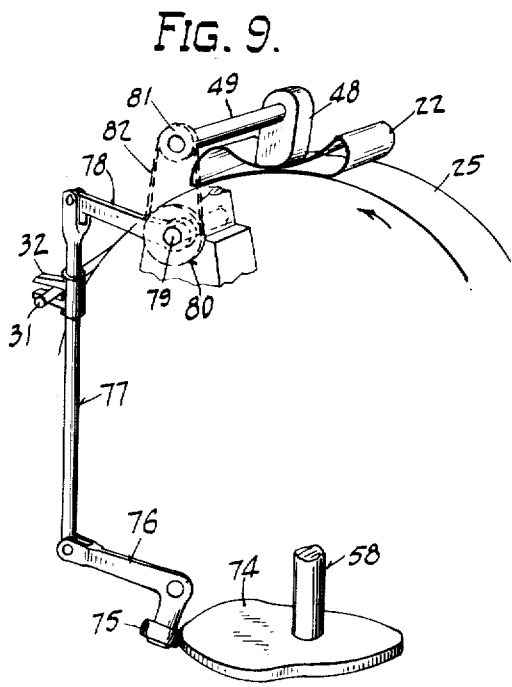
Fig. 9 is an enlarged schematic showing of the mechanism for operating the opener finger and the opening of a seal by the finger.
Figure 10:
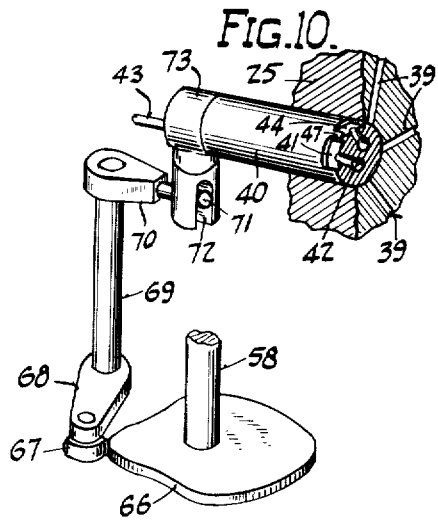
Fig. 10 is an enlarged schematic showing of the mechanism for operating the valve in the drum.
Figure 13:
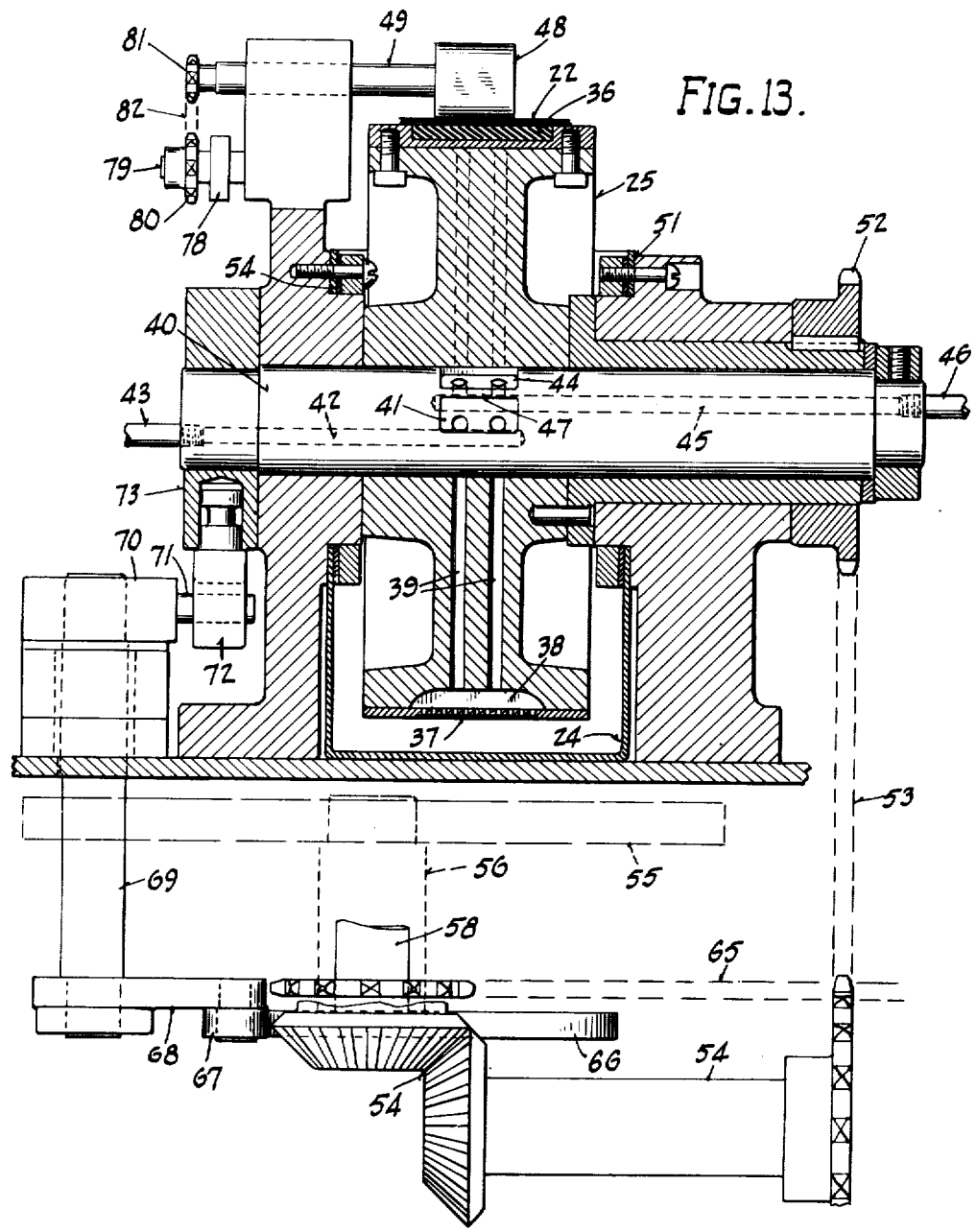
Fig. 13 is an axial section through the drum and valve taken on line 13—13 of Fig. 12.
Figure 27:
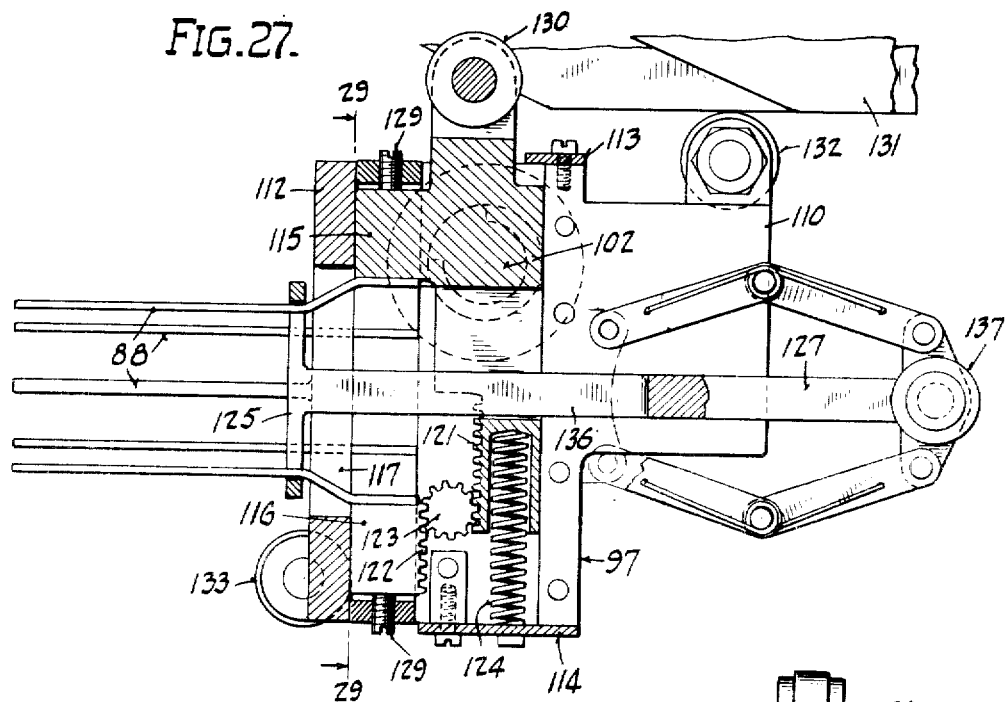
Fig. 27 is a view similar to Fig. 26 showing the fingers expanded as the head leaves the cam on the rear side of the carriage.
Figure 28:
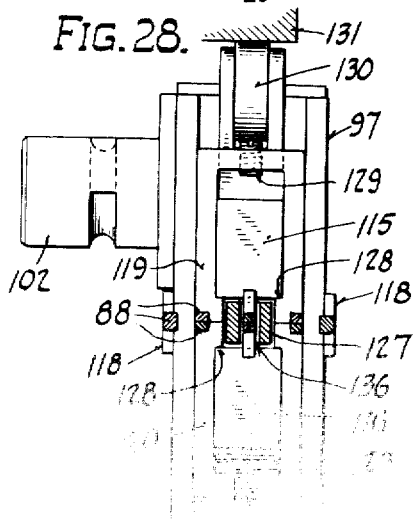
Fig. 28 is a vertical section through the head taken on line 28—28 of Fig. 26.
Figure 29:
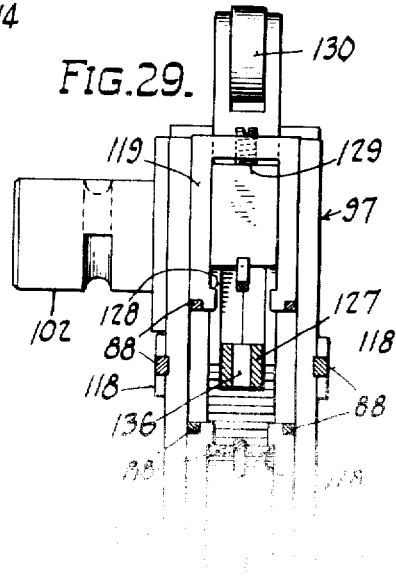
Fig. 29 is a similar section taken on line 29—29 of Fig. 27.

When the seal 22 reaches the opener station on top of the drum, the seal is engaged on its top central surface by a non-slip opener finger 48 which is eccentrically mounted on a shaft 49 to oscillate into pressure engagement with the seal and effect a lateral sliding of the upper seal wall over the lower seal wall and thereby cause the seal to open on opposite sides of the finger as shown in Figure 9. The seal 22 is then ready for entrance of the fingers 50 of the transfer carriage 3.

The three principal movements of the seal supply mechanism are: (1) the intermittent rotation of drum 25, (2) the control of the application of suction to ports 37 to effect lifting of a seal 22 to the pickup station and release of the seal for pickup and (3) the oscillation or rocking movement of opener 48. The mechanism for producing the three movements referred to is disposed in a housing between base 1 and tank 18 and driven by vertical shaft 13.

The intermittent rotation of drum 25 is effected through a Geneva movement drive. For this purpose the drum shaft 40 extends through sealed bearings 51 in the walls of the tank extension 24, and has a sprocket 52 on one end driven by a chain 53 from a horizontal stub shaft 54. The shaft 54 is driven by the Geneva plate 55 on vertical shaft 56 through beveled gearing 57.

The Geneva plate 55 is driven from the secondary vertical drive shaft 58 by means of a crank arm 59 secured to rotate on shaft 58 and having a vertical pin 60 in its end carrying a roller 61 adapted to fit into successive radial grooves or slots 62 in the Geneva plate 55 and to thereby advance the latter periodically.

The slots 62 have their entrances spaced apart circumferentially on plate 55 a distance sufficient to have roller 61 register with the next succeeding slot after it leaves one slot and rotates around to a position for entering the next slot, the plate 55 standing idle while the roller 61 is free thereof.

During the time roller 61 is engaged in a slot 62 in plate 55 it rotates the plate a predetermined amount and then automatically disengages itself from the plate. Continuous rotation of shaft 58 effects continuous rotation of roller 61 about the shaft and results in periodic engagement and rotational advancement of the Geneva plate by the roller.

During the time roller 61 is free from Geneva plate 55 the latter is locked against turning by a sector-like locking cam 63 on the upper end of shaft 58 in the plane of the plate and which enters and turns in an arc shaped recess 64 in the circumference or outer edge of the plate 55 between adjacent slots 62. The locking cam 63 is designed to enter recess 64 before roller 61 leaves slot 62 on one side, and to leave recess 64 after roller 61 enters slot 62 on the other side. In each instance mentioned the locking cam does not oppose the movement of the plate 55 by roller 61. When the roller 61 is free from the plate 55 the locking cam is in engagement with the plate at the recess 64 and has passed dead center in the recess to hold the plate against turning in either direction.

The secondary vertical drive shaft 58 is driven from main vertical drive shaft 13 by means of a chain 65 and corresponding sprockets therefor.

The periodic rotational movements of the drum 25 from station to station correspond to the periodic rotational movements of the Geneva plate 55, and the frequency of the periodic movements of drum 25 is determined by the speed of rotation of shaft 58 and in turn of drive shaft 13, there being preferably one rotational advancement of drum 25 for each revolution of shaft 58.

The number of Geneva slots in plate 55 should be equal to the number of opener faces on drum 25 where the drive between plate 55 and drum 25 is on a one to one ratio. In the construction illustrated it has been found convenient to provide seven opener faces on drum 25 and correspondingly seven slots 62 in Geneva plate 55.

The plate 55 is locked at all times between successive movements so that drum 25 is positively held against rotation between successive periods of advancement of the drum. For this purpose the circumference of plate 55 has alternate Geneva slots 62 and can lock recesses 64 therein.

The operation of valve 40 is effected from shaft 58 in coordination with the operation of drum 25. For this purpose a cam 66 on shaft 58 is engaged by a cam follower 67 on the end of a crank arm 68 secured to a vertical oscillating shaft 69.

The upper end of shaft 69 has a head 70 with a radial pin 71 extending outwardly and into a slotted radial pin 72 in the head 73 for the valve 40.

Cam 66 oscillates crank arm 68 back and forth once for each revolution of shaft 58 and thereby effects oscillation of valve member 40 in drum 25 through a short partial rotation and return.

The timing for valve 40 provides rotation of the valve with drum 25 as the latter rotates to lift a seal 22 upwardly from the stack and to position the previous seal at the opener station on top of the drum. The valve 40 then dwells until the finger 48 engages the seal on top of the drum, and thereafter returns, thereby disconnecting the upper seal 22 from the suction means and connecting the ports 37 at the stripper face next the stack to the suction means to secure the next seal to the drum.

The seal opener 48 is operated from shaft 58 in coordination with the periodic rotational advancement of drum 25. For this purpose a cam 74 on shaft 58 presses radially outward against a cam follower 75 on the lower end of a pivotally mounted right angle bell crank lever 76. The outer end of the lever 76 is pinned to a vertical link 77 extending upwardly to a crank arm 78 on a horizontal stub shaft 79 mounted just below shaft 49.

A sprocket 80 on shaft 79 drives a smaller sprocket 81 on shaft 49 by means of a chain 82.

The bell crank lever 76 produces a substantial vertical movement of link 77 and the several lever ratios and sprocket ratios provide a substantial rotational movement of finger 48 to effect a side swiping of seal 22 towards the edge held by ports 37. In this movement the upper wall of seal 22 which is engaged by the nonslip surface of member 48 slides over the lower wall of the seal which is gripped by the nonslip surface of the drum 25 and effects opening of the folded edges of the seal as shown in Figure 9.

When the seal is opened by member 48 as described, a pair of fingers 50 traveling on transfer carriage 3, enters the open end of the seals, one finger on each side of member 48, and carries the seal longitudinally off from drum 25.

The carriage 3 comprises a double chain conveyor 83 mounted on two pairs of spaced sprockets 84 disposed on parallel horizontal axis. One set of sprockets 84 is driven by beveled gearing 85 from a vertical stub shaft 86 which in turn is driven by vertical drive shaft 13 through chain 87 and suitable sprockets.

The carriage 3 is disposed to present two horizontal conveyor paths, one above the other, the lower path being disposed transversely of drum 25 to pick up the seals therefrom by fingers 50, and the upper path being disposed longitudinally beneath one side of carriage 4 to effect delivery of the seal by fingers 50 to the loading fingers 88 on carriage 4.

The conveyor chains 83 have a plurality of transfer heads 89 spaced equally therealong connecting the chains and each carrying a pair of fingers 50. The length of chains 83 and the speed ratio between chains 83 and drum 25 in the machine illustrated is such that four equally spaced transfer heads 89 on chains 83 are sufficient to provide a pickup for each successive seal 22 from the drum.

The transfer heads 89 are secured to individual links of chains 83 and each head extends horizontally across the space between the chains and comprises a box-like frame containing a pair of opposed lateral slides 90 biased toward each other by springs 91 in the opposite ends of the frame and each carrying one of the fingers 50 which extend outwardly through slots 92 in the frame of the head. Each slide 90 has a pin 93 passing inwardly through a corresponding slot 94 in the frame and which carries a cam roller 95 adapted to move the slide outwardly against its spring 91 when the roller 95 engages and rides against a central cam strip 96 disposed in the path thereof.

The cam strip 96 is located between the chains 83 in that part of the path of the conveyor chain wherein a seal 22 is carried from the opener station on drum 25 to the upper horizontal path where the seal is delivered to the loading fingers 88 of carriage 4.

The cam strip 96 serves to center the fingers 50 as they pick up the seal 22 from drum 25, and immediately following the pick up cam strip 96 widens so that rollers 95 on head 89 ride outwardly on the cam strip with the latter therebetween to spread fingers 50 and stretch seal 22 thereacross. The cam strip 96 maintains the fingers 50 spread as described throughout the continued travel of head 89 around the end sprockets and back on the upper path of the conveyor.

In the upper path of conveyor 83 the fingers 50 are maintained spread apart by cam 96 until after the seal is picked up by fingers 88. In this operation fingers 88 are disposed in the same horizontal plane as fingers 50 and are moved forwardly along the same path of travel at a faster rate so that they come between fingers 50 and enter the seal 22 and then strip the latter from the fingers 50. During this latter stripping operation rollers 95 are allowed to move inwardly following a narrowing of cam 96 to thereby release the seal 22 from fingers 50.

The fingers 50 remain contracted until they pick up another seal 22 from drum 25. The operation of each head 89 is alike and as described so that as the heads move along conveyor 83 they pick up successive seals 22 from drum 25 and transfer the same to successive sets of loading fingers 88.

Each set of loading fingers 88 is preferably constituted of eight fingers carried by a loading head 97 pivotally mounted on a frame 98 secured to a link of chain 99.

The chain 99 travels in a horizontal closed path over a pair of sprockets 100 which are preferably about twice the diameter of sprockets 84 to provide approximately twice the linear speed for loading heads 97 as is provided for transfer heads 89. The drive shaft 13 constitutes the shaft for one of the sprockets 100 and serves to drive the sprocket which thereby drives chain 99.

The chain 99 has two straight paths of substantial length, one on the rear side of the machine wherein the loading fingers 88 pick up a seal 22 from the corresponding transfer fingers 50, and the other on the front side of the machine wherein the loading fingers 88 place the seal upon a bottle top 101.

The number of heads 97 on chain 99 will depend upon the length of the chain and the speed ratio between chain 99 and chains 83. Where, as in the machine illustrated, chain 99 travels at a speed twice as fast as chains 83, the heads 97 should be spaced apart on chain 99 a distance equal to twice the distance of spacing of heads 89 on chains 83.

Each head 97 is mounted on a trunnion 102 extending through the frame 98 and secured therein against axial displacement by two parallel pins 103 disposed above and below the trunnion, respectively, and set in a suitable 270° circumferential groove in the trunnion.

Each pin 103 is biased inwardly to provide a short cushioned stroke therefor by a spring 104, and constitutes a stop against which the corresponding ends of the groove in trunnion 102 engage to limit the rotational movement of the trunnion and its head 97 to approximately 90°.

Each frame 98 is carried by a link of chain 99 and held against rotation by a set of four rollers 105 disposed at its corners with the upper two rollers riding in a groove or track 106 and the lower two rollers riding in a similar groove or track 107 on the stationary frame of the machine. The tracks 106 and 107 are vertically spaced and face each other to receive the frame 98 between them and are provided along the rear and the front straight sides of carriage 4 to guide the heads 97 in their operative movement during pick up of the seals 22 and placing of the same on the bottle tops 101.

The link of chain 99 carrying a corresponding frame 98 is disposed in a recess in the back of the frame directly between the upper and lower rollers 105.

At the curved ends of the path of chain 99, there are no side members for tracks 106 and 107, and rollers 105 merely ride between the top and bottom plate members 108 and 109, respectively.

Each head 97 comprises a box-like structure with a rear body 110 to the sides of which are secured side panels 111 extending forwardly therefrom with an inset front plate 112, a top plate 113 and a bottom cross plate 114, all of which provide a housing for a pair of slides 115 and 116.

The fingers 88 are eight in number and are constructed as parallel wires extending horizontally forward from the front plate 112. Six of the fingers 88 are movable and arranged in pairs with one finger of each pair disposed above the other. The pairs of fingers extend through laterally spaced vertical slots 117 in plate 112, one slot being in the center and the other two slots being near the side edges of the plate. The other two fingers 88 are stationary and fixed to side members 118 secured to corresponding side panels 111 centrally of their height, there being one finger 88 on each side of the head 97.

The upper movable finger of the central pair is secured to upper slide 115, and the lower movable finger of the central pair is secured to lower slide 116. The upper movable fingers of the two side pairs are secured to a yoke 119 mounted on the forward end of slide 115, and the lower movable fingers of the two side pairs are secured to a yoke 120 mounted on the forward end of slide 116.

Movement of slides 115 and 116 vertically toward and away from each other effects movement of the upper and lower fingers to bring the same together and to separate them vertically, respectively. When together the three pairs of fingers are closed vertically and are laterally spaced along a horizontal plane centrally of head 97 to provide for their entrance into a seal 22 as head 97 moves forwardly between a pair of transfer fingers 50 holding the seal.

After picking up the seal 22, the three pairs of fingers 88 are opened to separate the fingers vertically by operation of slides 115 and 116 and thereby open the seal to substantially circular section. For this purpose the upper slide 115 has a downwardly extending rear body with a rack 121 on its forward side. A corresponding rack 122 is disposed on the rear side of slide 116 facing rack 121, and a pinion 123 meshes with both racks 121 and 122 and is journaled in side panels 111.

A strong coil spring 124 rests on bottom plate 114 and extends upwardly into a recess in the body of slide 115 behind rack 121 to bias the slide 115 upwardly to normally separate the fingers 88. By using a spring 124 to effect separation of fingers 88 and expansion of seal 22, a cushion is provided in the expansion movement that automatically compensates for wide variations in seal sizes.

After a seal is removed from fingers 88 by stripper plate 125, as will be described hereinafter, the fingers separate farther under the influence of spring 124, the limit of separation being provided by the ends of the slots 117. Top plate 113 and bottom plate 114 also limit the outward movement of slides 115 and 116 in case of emergency.

The yokes 119 and 120 are mounted loosely on the corresponding slides 115 and 116, and each yoke has a slot 126 through its inner end for receiving the stripper rod 127 when the yokes are moved into engagement by movement of slides 115 and 116 toward each other. In moving inwardly slides 115 and 116 engage shoulders 128 in the yokes on the opposite sides of slot 126 in the corresponding yokes and effect movement of the latter inwardly.

When slides 115 and 116 separate, each engages an adjustable pin 129 threaded into the outer end of the corresponding yoke to force the yoke outwardly a sufficient amount to effect engagement of the seal by the fingers that are carried by the yokes.

Slides 115 and 116 have freedom of movement within the yokes between the shoulders 128 and pins 129, the distance of this movement providing for a movement of each central finger 88 outwardly from the plane of the fingers carried by the corresponding yoke to provide the circular opening for seal 22. The construction provides a lost motion connection between slides 115 and 116 and their corresponding yokes 119 and 120, and effects a definite relative positioning of the same at the ends of the stroke or movement of the slides.

The slides 115 and 116 are moved inwardly to position the fingers 88 adjacent a common horizontal plane for receiving a seal 22 from fingers 50 as the head 97 moves along the rear side of carriage 4. This inward movement of slides 115 and 116 is effected by a cam roller 130 mounted on top of slide 115 in substantial vertical alignment with spring 124, above the top plate 113. The roller 130 engages a cam track 131 disposed along the path of head 97 and adapted to force slide 115 downwardly against spring 124 to close the fingers 88. The cam track 131 has upwardly slanting ends to provide an approach and recession for the operative section of the track.

The inner portion of cam track 131 is engaged by a cam roller 132 mounted on the rear end of body 110 and which prevents tilting of head 97 under the vertical pressure on roller 130 and thereby holds the head 97 with the fingers 88 horizontal. For this purpose the vertical axial plane of cam roller 130 is preferably offset forwardly from the vertical axial plane of the trunnion 102 while the roller 132 is disposed substantially to the rear of the trunnion.

The cam track 131 extends along substantially the entire rear side of carriage 4 in the region where the heads 97 travel above carriage 3 to insure that the fingers 88 will be closed at all times when the paths of heads 97 and heads 89 overlap in parallel relation.

When the head 97 reaches the end of cam track 131 after fingers 88 have picked a seal 22 off from fingers 50, the roller 130 rides upwardly against a tapered end section of the track and releases the slide 115 to allow the same to move upwardly under the influence of spring 124 and separate fingers 88 to expand the seal and hold the same on the fingers. Thereafter roller 132 reaches the end of cam track 131 and releases head 97 from tilting control.

For this purpose the inner part of cam track 131 engaged by roller 132 is preferably substantially longer than the outer part engaged by roller 130 so that the head will be held horizontal at all times when fingers 88 are closed.

The trunnion 102 is mounted on one of the side panels 111 at a location to the rear of the center of gravity of head 97 whereby the head normally tilts forwardly when not controlled by a cam track. As a result, the head 97 tilts forwardly to about a 45° angle when cam roller 132 leaves cam track 131.

The head 97 is then tilted to position the fingers 88 vertically over a bottle top 101 at the beginning of the travel of the head along the front side of carriage 4. This is accomplished by a cam roller 133 disposed at the bottom forward corner of the inner side panel 11 and which engages a cam track 134 extending along the entire straight path of head 97 in which a seal is placed on a bottle top. The cam track 134 has suitable downwardly slanting ends to provide an approach and recession for the operative section of the track over which roller 133 rides.

The stripper plate 125 is mounted on the forward end of rod 127 between the stationary side fingers 88, and has three slots 135 therein through which the corresponding three pairs of movable fingers 88 extend and expand and contract.

The stripper rod 127 extends rearwardly between slides 115 and 116 and through body 110 of head 97, and is adapted to move longitudinally to reciprocate the stripper plate 125 longitudinally of the fingers 88 and effect the stripping of a seal 22 from the fingers. The rod 127 has a rearwardly extending central vertical slot 136 corresponding to the central slot 135 in plate 125 for receiving the central pair of fingers 88 in case the stripper plate should be moved forwardly accidentally while the fingers 88 are closed.

The rod 127 is pushed downwardly to strip a seal 22 from vertical fingers 88 and place the seal on bottle top 101 when the head 97 is traveling along the front side of carriage 4. For this purpose a cam roller 137 is mounted on the rear or top end of rod 127 and is adapted to engage a cam track 138 disposed above the path of travel for head 97 and slanting gradually downward to provide a relatively gradual stripping movement for the seal.

The head 97 is held in positive vertical position against the tilting force applied thereto by cam 138 to prevent displacement of fingers 88 from alignment with the bottle top 101, by means of the roller 133 riding on cam track 134 to the rear of trunnion 102 and holding head 97 vertical with the stop on trunnion 102 engaged by the lower pin 103.

The mechanism 5 for presenting bottles 139 in succession to the machine may comprise the main bottle conveyor 140. However, in the present instance, the main bottle conveyor 140 is in front of the machine, and an auxiliary bottle conveyor 141 is provided to be driven by sprocket 16 from chain 17 and shaft 10 in coordination with the carriages 3 and 4.

A bottle 139 traveling along conveyor 140 first arrives at a transfer station where a plunger 142 operated by a solenoid valve controlled air cylinder 143 pushes the bottle laterally onto the conveyor 141.

The conveyor 141 travels on a flat track 144 extending horizontally beneath the travel of heads 97 along the front side of the machine, and has spaced upward flanges 145 adapted to push successive bottles 139 in position beneath the heads 97. The pusher flanges 145 are spaced apart equally with heads 97 and the speed of conveyor 141 is the same as that for the heads 97 so that with the drives coordinated the heads 97 always travel above a bottle location on the conveyor 141.

If desired, the machine may have a resilient stop 146 which is engaged by the bottle after it is first transferred to conveyor 141 and holds it upright and against forward travel until a pusher flange 145 engages the bottle and carries it along the conveyor. The stop 146 is in the form of a pivotally mounted gate held across the path of conveyor 141 by means of a spring 147.

The bottles 139 are discharged from conveyor 141 back onto main conveyor 140 by means of a guide 148 arranged diagonally across the conveyor 141. The two conveyors 140 and 141 are at the same level and are close together so that bottles may be readily transferred laterally from one to the other.

Figure 30:
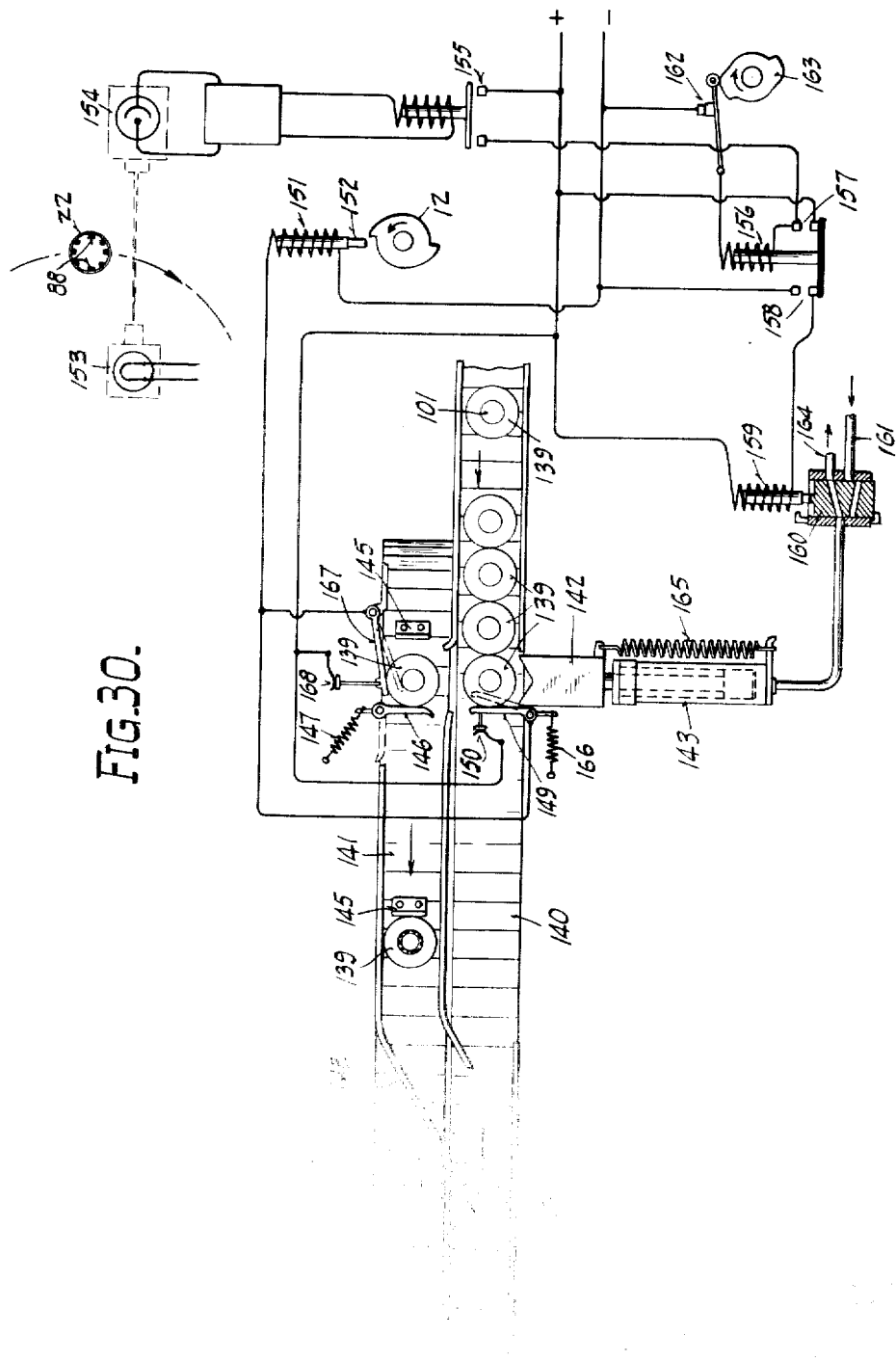
Fig. 30 is a schematic showing of the bottle feeding mechanism and the electrical interlock for automatically governing the operation of the machine.

The electrical control and interlocking circuits are illustrated in Fig. 30.

When a bottle 139 arrives at the transfer station on the main conveyor 140, it engages a spring biased arm 149 to close the normally open starter switch 150 which energizes solenoid 151 releasing the plunger 152 of the single revolution clutch 12, thereby effecting rotation of shaft 10 by motor 7. Rotation of shaft 10 effects operation of the machine as previously described to deliver a seal 22 to the position on the front of carriage 4 for applying the same to the bottle 139.

The plunger 152 of clutch 12 is held out to effect continued driving of the machine as long as a bottle 139 rests against arm 149 and holds switch 150 closed.

When the seal 22 on a head 97 passes around the end of carriage 4 from the rear side to the forward side of the carriage, the seal cuts through a beam of light extending from the light source 153 to a photoelectric cell 154, or similar control means. Interruption of the light entering cell 154 effects closing of the normally open relay switch 155 which in turn momentarily energizes a solenoid 156 of a holding switch 157 and the valve actuating switch 158.

Closing of switch 158 energizes solenoid 159 which operates valve 160 to connect the air cylinder 143 to a source of compressed air through supply conduit 161. The compressed air thereby supplied to the rear end of cylinder 143 pushes plunger 142 forward to transfer bottle 139 from conveyor 140 to conveyor 141. The plunger 142, while in its forward position holds starter switch 150 closed, thereby maintaining operation of clutch 12 to drive the machine.

A limit switch 162 operated by the rotation of one of the sprockets of conveyor 141 or by any other rotational part of the machine such as a cam wheel 163, in synchronism with the delivery of seals to the bottles, serves to de-energize solenoid 156 and permit opening of holding switch 157 and valve switch 158.

When valve switch 158 is opened, it de-energizes valve solenoid 159, thereby permitting valve 160 to shift and connect air cylinder 143 to the exhaust conduit 164. A spring 165 then returns plunger 142 to retracted position and allows the next bottle 139 to engage switch arm 149 to continue the operation of the machine.

Should there be no successive bottle 139 to engage arm 149, the arm is biased forwardly by its spring 166 to open switch 150 and permit plunger 152 to stop clutch 12 when the latter has completed the cycle of rotation (one-half a revolution) corresponding to one cycle of movement for drum 25, whereupon the machine stops.

The continued successive supply of bottles 139 to the machine maintains starter switch 150 closed and effects a continuous operation of the machine at its intended speed.

The bottles 139 are transferred to the conveyor 141 of the machine only in response to the presence of corresponding seals on head 97 that will register with the bottles. Should no seal be present when a head 97 approaches the loading position, the corresponding bottle 139 is not transferred to conveyor 141, and instead awaits a time when a seal is presented for application to it.

When a bottle 139 is shoved onto conveyor 141 by plunger 142, the bottle engages a switch arm 167 which closes switch 168 connected in parallel with switch 150 in the circuit of clutch solenoid 151 to hold plunger 152 out and allow clutch 12 to operate for one more cycle, in order that the seal 22 will be applied to the bottle in the event that there is no succeeding bottle and switch 150 opens.

The bottles are prevented from moving on conveyor 141 ahead of the proper position for registry with the corresponding head 97 of carriage 4, and are caused to travel on conveyor 141 in proper registry with the corresponding heads. For this purpose, a series of accurately spaced flanges or driver abutments 145 are positioned transversely across the conveyor 141 and are moved therewith to engage corresponding bottles 139 and to move the latter along the conveyor at a speed correspondng to that of heads 97 and in registry with the corresponding heads.

A yielding pivoted gate 146 extends across conveyor 141 to stop the movement of each bottle 139 along the conveyor until an abutment 145 engages the bottle and forces it to travel along the conveyor. The gate 146 is adapted to swing out of the way of the bottle as the latter is moved by abutment 145, and when the bottle clears the gate, the latter swings back across the conveyor under the biasing influence of spring 147 to catch the next bottle.

The machine is adapted to place seals at a rate faster than machines heretofore constructed and it is compact and unitary, and adapted for ready placement along a conveyor line.

Various embodiments of the invention may be employed within the scope of the accompanying claims.

I claim:

1. In a machine of the class described adapted to apply seals of the tubular regenerated cellulose type to bottle tops and the like, means to supply flat folded seals in rapid succession, means disposed in correlaton to said first named means to successively open said seals, transfer means including a plurality of spaced heads traveling in a closed path and disposed to pick up open seals from said opening means in succession and to transfer the same to loading means, continuously moving loading means disposed to receive said seals on the fly from said transfer means, continuously moving means to feed a plurality of bottles through the machine in rapid succession, means to coordinate said loading means and bottle feeding means to separately position each seal above a corresponding moving bottle and in vertical alignment therewith as the bottles travel in a continuous movement through the machine, and means carried by said loading means and adapted to strip the seals downwardly therefrom and thereby position the seals on the corresponding bottles in succession.

2. In a machine of the class described adapted to apply seals of the tubular regenerated cellulose type to bottle tops and the like, means to supply flat folded seals in rapid succession, means disposed in correlation to said first named means to open said seals one by one, means disposed to apply said seals successively to corresponding bottle tops, a transfer carriage having a plurality of heads traveling continuously in a closed path between said seal opening means and applying means, said heads being adapted to pick up said open seals in succession and to transfer the same to said applying means, and means driving said several means and transfer carriage in coordination.

3. In a machine of the class described adapted to apply seals of the tubular regenerated cellulose type to bottle tops and the like, means to supply open seals one by one, and a loading carriage having a plurality of heads traveling continuously in a closed path adjacent and in part overlapping said supply means, each said head being pivotally supported on a horizontal axis by said carriage to pick up a corresponding open seal on the fly and while the seal is in a horizontal position, to rotate the seal to a vertical position and apply the same to a bottle top.

4. In a machine of the class described adapted to apply seals of the tubular regenerated cellulose type to bottle tops and the like, means to supply flat folded seals in rapid succession, means disposed in correlation to said first named means to open said seals one by one, a loading carriage having a plurality of heads traveling continuously in a closed path, each of said heads being adapted to receive an open seal for applying the same to a bottle, means disposed between said seal opening means and loading carriage to pick up open seals successively from said opening means and to deliver the same on the fly to corresponding heads, means to feed bottles to be sealed successively along a path beneath and parallel to a part of the path of said heads with a bottle located beneath each corresponding head to receive a seal therefrom, means to move said loading heads and bottles at the same speed along said parallel courses, and means to effect a transfer of a seal from each head to the corresponding bottle during their joint travel along said courses.

5. In a machine of the class described adapted to apply seals of the tubular regenerated cellulose type to bottle tops and the like, means to supply seals in succession, a loading carriage having a plurality of heads traveling in a closed path, each of said heads being adapted to receive a seal for applying the same to a bottle, and a transfer carriage having a plurality of heads traveling continuously in a closed path, said latter heads being adapted to pick up said seals automatically from said supply means in succession and to transfer the same to corresponding heads on said loading carriage.

6. In a machine of the class described adapted to apply seals of the tubular regenerated cellulose type to bottle tops and the like, means to supply open seals in succession, a loading carriage having a plurality of heads traveling in a closed path, each of said heads being adapted to receive a seal for applying the same to a bottle, a transfer carriage having a plurality of heads traveling in a closed path, said heads being adapted to pick up said open seals in succession and to transfer the same to corresponding heads on said loading carriage, the loading and transfer heads having fingers for carrying the seals and having their paths parallel and overlapping in a substantially straight course for a substantial distance with the fingers of said loading head adapted to move between those of the transfer head, and means to move said loading heads at a faster speed than said transfer heads whereby a loading head passes a corresponding transfer head in said parallel course and effects stripping of a seal from said transfer fingers by the loading fingers.

7. In a machine of the class described adapted to apply seals of the tubular regenerated cellulose type to bottle tops and the like, means to supply flat folded seals in rapid succession, means disposed in correlation to said first named means to open said seals one by one while the axis of each seal is disposed substantially horizontally, means to apply said seals successively to corresponding bottle tops, and a transfer carriage having a plurality of heads traveling in a closed path between said opening means and said applying means, each of said heads having a pair of substantially horizontal parallel pickup fingers disposed to enter horizontally and pick up a seal from said opener and to thereafter separate laterally to stretch the seal therebetween for carrying the same to said applying means.

8. In a machine of the class described adapted to apply seals of the tubular regenerated cellulose type to bottle tops and the like, means to supply flat folded seals in rapid succession, means disposed in correlation to said first named means to open said seals one by one, means to apply said seals successively to corresponding bottle tops, a transfer carriage having a plurality of heads traveling in a closed path between said opening means and said applying means, each of said heads having a pair of parallel pickup fingers adapted to enter and pick up a seal from said opener and to thereafter separate laterally to stretch the seal therebetween for carrying the same to said applying means, and means responsive to the movement of said heads to effect operation of said fingers.

9. In a machine of the class described adapted to apply seals of the tubular regenerated cellulose type to bottle tops and the like, means to supply flat folded seals in rapid succession, means disposed in correlation to said first named means to open said seals one by one, means to apply said seals successively to corresponding bottle tops, a transfer carriage having a plurality of heads traveling in a closed path between said opening means and said applying means, each of said heads having a pair of parallel pickup fingers adapted to enter and pick up a seal from said opener and to thereafter separate laterally to stretch the seal therebetween for carrying the same to said applying means, means normally contacting said fingers, and cam means disposed in the path of said heads and engaged by follower means on said heads for separating said fingers during the travel of said heads in a predetermined part of said closed path.

10. In a machine of the class described adapted to apply seals of the tubular regenerated cellulose type to bottle tops and the like, a transfer carriage having a plurality of heads traveling in a closed path, each of said heads having a pair of non-pivotal parallel pickup fingers adapted to enter and pick up a seal and to thereafter separate laterally to stretch the seal therebetween for carrying the same, means normally contacting said fingers, and cam means disposed in the path of said heads and engaged by follower means on said heads for separating said fingers during the travel of said heads in a predetermined part of said closed path.

11. In a machine of the class described adapted to apply seals of the tubular regenerated cellulose type to bottle tops and the like, a head for a loading carriage, traveling in a closed path, comprising a body having a plurality of non-pivotal parallel fingers normally disposed in a substantially common plane for entering a corresponding seal, and means operating through said head to thereafter separate and distribute the fingers about a given circumference and thereby stretch the seal to a substantially circular shape for carrying the same and applying the seal to a bottle.

12. In a machine of the class described adapted to apply seals of the tubular regenerated cellulose type to bottle tops and the like, a head for a loading carriage traveling in a closed path, comprising a body having a plurality of non-pivotal parallel fingers disposed in a substantially common plane for entering a corresponding seal, means operating through said head to thereafter separate and distribute the fingers about a given circumference and thereby stretch the seal to a substantially circular shape for carrying the same and applying the seal to a bottle, means carried by the head and normally expanding said fingers, and cam means disposed in the path of said head and engaged by follower means on said head for contracting said fingers during a predetermined part of the travel of said head for loading the same.

13. In a machine of the class described adapted to apply seals of the tubular regenerated cellulose type to bottle tops and the like, means to supply open seals in succession, a loading carriage having a plurality of heads traveling in a closed path, each said head being adapted to receive a corresponding seal for applying the same to a bottle, a transfer carriage having a plurality of heads traveling in a closed path, said last named heads being adapted to pick up said open seals in succession and to transfer the same to corresponding heads on said loading carriage, the loading and transfer heads having fingers for carrying the seals and having their paths parallel and overlapping for a substantial distance with the fingers of said loading head adapted to move between those of the transfer head, means to move said loading heads at a faster speed than said transfer heads whereby a loading head passes a corresponding transfer head in said parallel course and effects stripping of a seal from said transfer fingers by the loading fingers, the fingers on each loading head being disposed in a substantially common plane to enter said seal and strip the same from said transfer fingers, and means to separate said loading fingers after they receive a seal to stretch the latter to a substantially circular shape for applying to a bottle.

14. In a machine of the class described adapted to apply seals of the tubular regenerated cellulose type to bottle tops and the like, means to supply open seals in succession, a loading carriage having a plurality of heads traveling in a closed path, each said head being adapted to receive a corresponding seal for applying the same to a bottle, a transfer carriage having a plurality of heads traveling in a closed path, said last named heads being adapted to pick up said open seals in succession and to transfer the same to corresponding heads on said loading carriage, the loading and transfer heads having fingers for carrying the seals and having their paths parallel and overlapping for a substantial distance with the fingers of said loading head adapted to move between those of the transfer head, means to move said loading heads at a faster speed than said transfer heads whereby a loading head passes a corresponding transfer head in said parallel course and effects stripping of a seal from said transfer fingers by the loading fingers, the fingers on each loading head being disposed in a substantially common plane to enter said seal and strip the same from said transfer fingers, means to separate said loading fingers after they receive a seal to stretch the latter to a substantially circular shape for applying to a bottle, and cam means disposed in the path of movement of said loading heads and engaged by followers on said heads to effect the contraction of said fingers in the region of overlap in travel of said loading and transfer heads.

15. In a machine of the class described adapted to apply seals of the tubular regenerated cellulose type to bottle tops and the like, a base containing a drive motor, a vertical drive shaft driven by said motor, a seal supply tank supported above said base and having a magazine of seals submerged in a preservative liquid, a rotary drum disposed at one end of said magazine for stripping seals therefrom one by one and lifting them from said liquid to a pickup station thereon, a transfer carriage disposed above said drum and having an endless chain, a plurality of transfer heads spaced apart on said chain and adapted to traverse said pickup station to pick up successive seals from said drum, means to apply said seals from said transfer heads to corresponding bottle tops, and means for driving said drum and transfer carriage from said vertical drive shaft to effect coordination therebetween.

16. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a transfer carriage disposed above said drum and having an endless chain, a plurality of transfer heads spaced apart on said chain and adapted to traverse said pickup station to pick up successive seals from said drum, means to apply said seals from said transfer heads to corresponding bottle tops, and means for driving said drum and transfer carriage in coordination.

17. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a transfer carriage disposed above said drum and having an endless chain, a plurality of transfer heads spaced apart on said chain and adapted to traverse said pickup station to pick up successive seals from said drum, means to apply said seals from said transfer heads to corresponding bottle tops, and means for driving said drum, said transfer carriage and said applying means from a common source of power to effect coordination therebetween.

18. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a transfer carriage disposed above said drum and having an endless chain, a plurality of transfer heads spaced apart on said chain and adapted to traverse said pickup station to pick up successive seals from said drum, means to open said seals at said pickup station, means to apply said seals from said transfer heads to bottle tops, and means for driving said drum, transfer carriage, opener means and applying means from a common source of power to effect coordination therebetween.

19. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a transfer carriage disposed above said drum and having an endless chain, a plurality of transfer heads spaced apart on said chain and adapted to traverse said pickup station to pick up successive seals from said drum, a loading carriage disposed adjacent said transfer carriage and having an endless chain, a plurality of loader heads spaced apart on said last named chain and adapted to traverse a part of the path of said transfer heads to receive seals therefrom, means to apply said seals from said loader heads to corresponding bottles, and means for driving said drum and said carriages from a common source of power to effect coordination therebetween.

20. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a continuously rotating member, a rotary plate having spaced Geneva slots therein, means on said member adapted to enter said slots successively and to intermittently rotate said plate, and means to transmit said intermittent rotation of said plate to said drum.

21. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a continuously rotating member, a rotary plate having spaced Geneva slots therein, means on said member adapted to enter said slots successively and to intermittently rotate said plate, means to transmit said intermittent rotation of said plate to said drum, and means on said rotary member and engaging said plate when said means is free from said Geneva slots to lock said plate against rotation between said intermittent periods of rotation.

22. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a non-slip finger disposed to extend over the seal on said drum at said pickup station, and a rotary support for said finger adapted to pass the finger across the seal in engagement therewith to open the same.

23. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a non-slip finger disposed to extend over the seal on said drum at said pickup station, rotary support for said finger adapted to pass the finger across the seal in engagement therewith to open the same, means to rotate said drum, and means to coordinate the rotation of said drum and the rotary movement of said finger to effect successive delivery and opening of seals one by one.

24. In a machine of the class described adapted to apply seals of the tubular regenerated cellulose type to bottle tops and the like, a seal supply tank having a magazine of seals submerged in a preservative liquid, a rotary drum disposed at one end of said magazine for stripping seals therefrom one by one and lifting them from said liquid to a pickup station thereon, a non-slip finger disposed to extend over the seal on said drum at said pickup station, a rotary support for said finger adapted to pass the finger across the seal in engagement therewith to open the same, means to intermittently rotate said drum to present successive seals at said pickup station thereon, and means to effect rotary movement of said finger across each seal as the drum dwells in its movement with the corresponding seal at said pickup station.

25. In a machine of the class described for applying seals to bottles and the like, a loading carriage having a plurality of seal carrying heads adapted to travel in a substantially straight path along a loading platform, a bottle conveyor constituting the loading platform and disposed beneath said carriage to feed bottles successively therealong, means on said conveyor to space said bottles equally with said heads, means to drive said carriage and conveyor in correlation to provide the same rate of movement for said heads and the corresponding bottles, and stationary means above said loading platform disposed to engage means on said heads as the latter traverse the loading platform to drop a seal from each head to a corresponding bottle.

26. In a machine of the class described for applying seals to bottles and the like, a loading carriage having a plurality of seal carrying heads adapted to travel along a loading platform, a bottle conveyor constituting the loading platform and disposed beneath said carriage to feed bottles successively therealong, means on said conveyor to space said bottles equally with said heads, means to drive said carriage and conveyor in correlation to provide the same rate of movement for said heads and the corresponding bottles, means to deliver bottles successively to said bottle conveyor, and means to prevent the operation of said last named means in the absence of a seal on the corresponding head.

27. In a machine of the class described for applying seals to bottles and the like, a loading carriage having a plurality of seal carrying heads adapted to travel along a loading platform, a bottle conveyor constituting the loading platform and disposed beneath said carriage to feed bottles successively therealong, means on said conveyor to space said bottles equally with said heads, means to drive said carriage and conveyor in correlation to provide the same rate of movement for said heads and the corresponding bottles, means to deliver bottles successively to said bottle conveyor, means interlocking said delivery means with said drive to stop the latter upon the failure of bottles to be delivered to the conveyor, and means to prevent the operation of said bottle delivery means in the absence of a seal on the corresponding head.

JACK LEE POMEROY.

References Cited in the file of this patent

UNITED STATES PATENTS

| Number | Name | Date |
|---|---|---|
| 1,339,370 | Roehrig | May 4, 1920 |
| 1,743,734 | Steele | Jan. 14, 1930 |
| 1,835,336 | Risser | Dec. 8, 1931 |
| 2,049,022 | Reininger | July 28, 1936 |
| 2,103,302 | Strout | Dec. 28, 1937 |
| 2,273,689 | Boron et al. | Feb. 17, 1942 |
| 2,417,938 | Kruger | Mar. 25, 1947 |
| 2,472,664 | Krueger | June 7, 1949 |
| 2,579,458 | Allen et al. | Dec. 25, 1951 |

Certificate of Correction

Patent No. 2,652,963 September 22, 1953

JACK LEE POMEROY

It is hereby certified that error appears in the printed specification of the above numbered patent requiring correction as follows:

Column 16, lines 16 and 29, for "contacting" each occurrence, read *contracting*;

and that the said Letters Patent should be read as corrected above, so that the same may conform to the record of the case in the Patent Office.

Signed and sealed this 3rd day of November, A. D. 1953.

[SEAL]

ARTHUR W. CROCKER,
*Assistant Commissioner of Patents.*